United States Patent
Nakao et al.

[11] Patent Number: 6,114,637
[45] Date of Patent: Sep. 5, 2000

[54] ROCKER-TYPE MANIPULATOR FOR SELECTIVELY OPERATING SWITCHES MOUNTED IN LIQUID CRYSTAL DISPLAY APPARATUS

[75] Inventors: Takuji Nakao; Katsuo Matsuyama, both of Tanashi, Japan

[73] Assignee: Citizen Watch Co., Ltd., Tokyo, Japan

[21] Appl. No.: 08/945,637

[22] PCT Filed: Mar. 5, 1997

[86] PCT No.: PCT/JP97/00678

§ 371 Date: Oct. 31, 1997

§ 102(e) Date: Oct. 31, 1997

[87] PCT Pub. No.: WO97/33431

PCT Pub. Date: Sep. 12, 1997

[30] Foreign Application Priority Data

Mar. 5, 1996 [JP] Japan ..................................... 8-047461
Sep. 5, 1996 [JP] Japan ..................................... 8-234953

[51] Int. Cl.[7] ............................ H01H 9/00; H01H 23/00; H04N 5/64
[52] U.S. Cl. ............................ 200/5 R; 200/339; 200/557
[58] Field of Search .................................... 200/339, 5 R, 200/6 A, 17 R, 553–562, 329

[56] References Cited

U.S. PATENT DOCUMENTS

| | | | |
|---|---|---|---|
| 4,045,650 | 8/1977 | Nestor ...................................... | 200/557 |
| 4,386,254 | 5/1983 | Eberhardt et al. ....................... | 200/339 |
| 4,401,864 | 8/1983 | Ichikawa ................................. | 200/17 R |
| 4,472,610 | 9/1984 | Fuller et al. ............................. | 200/5 A |
| 4,883,932 | 11/1989 | Van Hout et al. ....................... | 200/339 |
| 5,087,798 | 2/1992 | Rohde et al. ........................... | 200/339 X |
| 5,164,554 | 11/1992 | Ikunami ................................. | 200/557 X |
| 5,468,924 | 11/1995 | Naitou et al. ........................... | 200/6 A |
| 5,692,044 | 11/1997 | Hughes et al. ........................ | 200/553 X |

FOREIGN PATENT DOCUMENTS

| | | |
|---|---|---|
| 9305822 U | 6/1993 | Germany . |
| 9218404 U | 1/1994 | Germany . |
| 61-87433 | 6/1986 | Japan . |
| 63-12981 | 1/1988 | Japan . |
| 2-110136 | 9/1990 | Japan . |
| 3-157076 | 7/1991 | Japan . |
| 2 087 154 | 5/1982 | United Kingdom . |

*Primary Examiner*—J. R. Scott
*Attorney, Agent, or Firm*—Finnegan, Henderson, Farabow, Garrett & Dunner, L.L.P.

[57] ABSTRACT

The present invention relates to an improvement made on the structure of a switch manipulator for a liquid-crystal display apparatus. In a liquid-crystal display apparatus includes a liquid-crystal display unit accommodating a liquid-crystal panel and switches used to control the operation of the liquid-crystal display unit are stowed in a case, and at least an image display unit and a switch manipulator used to manipulate the switches are located on the face of the case, the switch manipulator includes at least two switches, the switches are separated from each other, a manipulation button is placed over the separated switches, and first and second button pressers are located near both ends of the manipulation button with substantially the center of said manipulation button as a fulcrum. When the manipulation button is pressed, one of the two switches is selectively turned on or off by the first or second button presser. According to the present invention, the manipulation button has a seesaw structure utilizing a distorting force and returning force exerted by the switch manipulator itself. Thus, a switch manipulator having a mechanism in which gaps can be set easily and which can exert a stable returning force and enable efficient mass-production at low cost and easy maintenance, and offering excellent operability can be provided.

32 Claims, 15 Drawing Sheets

ROCKER-TYPE MANIPULATOR FOR SELECTIVELY OPERATING SWITCHES MOUNTED IN LIQUID CRYSTAL DISPLAY APPARATUS

DESCRIPTION

1. Technical Field

The present invention relates to a liquid-crystal display apparatus used as a portable liquid-crystal television set, portable liquid-crystal monitor apparatus, or the like. More particularly, this invention is concerned with an improvement to the mechanism of a switch manipulator used to tune a channel and included in a liquid-crystal display apparatus.

A liquid-crystal display apparatus for displaying an image on a liquid-crystal panel can be designed to be lighter in weight, more compact, thinner, and lower in power consumption than a conventional display apparatus for displaying an image on a cathode-ray tube. The liquid-crystal display apparatus is therefore widely adopted as a portable display apparatus such as a monitor apparatus, television set, multimedia equipment, or the like.

2. Background Art

A liquid-crystal display apparatus includes a switch used to adjust brightness or contrast so as to adjust the visibility of a displayed image and a variable resistor used to adjust a volume. When the liquid-crystal display apparatus is used as a liquid-crystal television set, a channel tuning switch used to tune a television reception channel is also included.

The structure of switches and their surroundings in a conventional liquid-crystal display apparatus is described in, for example, Japanese Unexamined Patent Publication No. 3-157076, Japanese Utility Model Publication No. 63-200874, or Japanese Utility Model Publication No. 1-49888.

In Japanese Unexamined Patent Publication No. 3-157076, a plurality of operation switches having switch manipulators jutting from an upper case have been disclosed. Operations are carried out by pressing the jutting switch manipulators of the operation switches with a finger.

Japanese Utility Model Publication No. 63-200874 has disclosed a structure where a switch manipulator is a push button; the apex of the push button is jutting out from a case; when the push button is pressed, a contact attached to the push button comes into contact with an opposed contact; and when the push button is released, the contact is separated owing to a recovering force exerted by an elastic member (made of, for example, rubber).

The Japanese Utility Model Publication No. 1-49888 has disclosed a liquid-crystal display having a plurality of tactile switches that are very small push-button switches, and a structure where manipulation buttons are placed on the tops of the switch manipulators of the tactile switches; and when any switch manipulator is released, the pressed manipulation button is recovered to an original state owing to a returning force exerted by the tactile switch.

DISCLOSURE OF THE INVENTION

Accordingly, an object of the present invention is to provide a switch manipulator that has a structure including a seesaw-like manipulation button and utilizing a distorting force and returning force exerted by the switch manipulator itself, has a mechanism in which a gap can be set easily, and which exerts a stable returning force and enables mass-production at low cost and provides easy maintenance, and offers excellent operability. Another object of the present invention is to provide a liquid-crystal display apparatus having the switch manipulator.

According to one aspect of the present invention, there is provided a liquid-crystal display apparatus in which at least a liquid-crystal display unit accommodating a liquid-crystal panel and switches are stowed in a case, and at least an image display unit and a switch manipulator for use in manipulating the switches are located on the face of the case. The switch manipulator includes at least two switches. The two switches are separated from each other, and a manipulation button is placed over the two switches. First and second button pressers are located near both ends of the manipulation button with substantially the center of the manipulation button as a fulcrum. When the manipulation button is pressed, one of the two switches is selectively turned on or off by either the first or second button presser.

Preferably, the switch manipulator has arm members, which have a certain length in a direction orthogonal to the longitudinal direction of the manipulation button, formed at the fulcrum of the manipulation button to jut out from a side of the manipulation button. The case has arm member receptors each composed of at least two convex members that jut down parallel to each other with a certain space between them. The arm member receptors are arranged at at least two opposed positions coincident with the arm members on a manipulation button insertion area formed in the case. Each arm member of the manipulation button is fitted into a certain space between the two convex members constituting an arm member receiver so that the switch manipulator can tilt.

Preferably, an arm member clamp is formed with at least two convex members, which jut down from the case parallel to each other with a certain space between them, at at least one position outside the at least one pair of two convex members jutting down from from the case. An arm member is clamped by the arm member clamp and thus supported thereby. When the manipulation button is pressed, the arm members are distorted. When the manipulation button is released, the manipulation button is reset by utilizing movements made by the arm members to return from the distorted state.

More preferably, an arm member clamp is formed with at least two convex members which jut down from the case parallel to each other with a certain space between them at at least one position outside the at least one pair of two convex members jutting down from the case. An arm member is clamped by the arm member clamp and thus supported thereby. When the manipulation button is pressed, the arm member clamp opens outward. When the manipulation button is released, the manipulation button is reset by utilizing a force exerted by the open arm member clamp to return to an original state.

According to another aspect of the present invention, there is provided a liquid-crystal display apparatus in which at least a liquid-crystal display unit accommodating a liquid-crystal panel and switches are stowed in a case, and at least an image display unit and a switch manipulator used to manipulate the switches are located on the face of the case. The switch manipulator includes a manipulation button used to turn on or off the switches. The manipulation button has arm members, which have a certain length in a direction orthogonal to the longitudinal direction of the manipulation button, located substantially in the center of the manipulation button. When the manipulation button is pressed, the arm members are distorted. When the manipulation button is released, the manipulation button is reset by utilizing the movements made by the arm members to return from the distorted state.

According to yet another aspect of the present invention, there is provided a liquid-crystal display apparatus in which at least a liquid-crystal display unit accommodating a liquid-crystal panel and switches are stowed in a case, and at least an image display unit and a switch manipulator used to manipulate the switches are located on the face of the case. The switch manipulator includes a manipulation button used to turn on or off the switches. The manipulation button has arm members, which have a certain length in a direction orthogonal to the longitudinal direction of the manipulation button, located substantially in the center of the manipulation button. The case has an arm member clamp composed of at least two convex members for supporting an arm member. When the manipulation button is pressed, the arm member clamp opens outward. When the manipulation button is released, the manipulation button is reset by utilizing a force exerted by the open arm member clamp to return the manipulation button to an original state.

More preferably, the manipulation button of the switch is made of a resin material such as ABS or PS, a carbon fiber reinforced resin material, a liquid-crystal polymer, a polypropylene material, a polyester material, or a polycarbonate material.

More preferably, the arm members of the manipulation button are made of the same material as the manipulation button, and molded as parts of the manipulation button.

According to yet another aspect of the present invention, there is provided a liquid-crystal display apparatus in which at least a liquid-crystal display unit accommodating a liquid-crystal panel and switches are stowed in a case, and at least an image display and a switch manipulator used to manipulate the switches are located on the face of the case. The switch manipulator has a manipulation button. A button attachment hole to be covered with the manipulation button is bored in the face of the case. Supports for supporting arm members of the manipulation button are located at mutually opposed positions on the perimeter of the button attachment hole. The manipulation button has at least two supporting pins at mutually opposed positions on the perimeter of the manipulation button, and also has first and second button pressers used to move the switches on the left-hand and right-hand sides of a straight line linking the supporting pins. The manipulation button has the supporting pins thereof fitted into the supports formed on the button attachment hole and is thus supported so that the manipulation button can slide and be detached.

According to yet another aspect of the present invention, there is provided a liquid-crystal display apparatus in which at least a liquid-crystal display unit accommodating a liquid-crystal panel and switches are stowed in a case, and at least an image display unit and a switch manipulator used to manipulate the switches are located on the face of the case. The switch manipulator has a manipulation button. A button attachment hole to be covered with the manipulation button is bored in the face of the case. Supports for supporting arm members of the manipulation button are located at mutually opposed positions on the perimeter of the button attachment hole. The manipulation button has at least two supporting pins located at mutually opposed positions on the perimeter of the manipulation button, and also has first and second pressers used to move the switches on the left-hand and right-hand sides of a straight line linking the supporting pins. A decorative member having a button exposure hole through which the manipulation button is exposed is placed on the face of the case. The manipulation button has the support pins thereof fitted into the supports formed on the button attachment hole and is thus supported so that the manipulation button can slide and can be detached. The decorative member is also detachable. The manipulation button is exposed through the button exposure hole bored in the decorative member.

More preferably, supports for supporting the manipulation button from below are located under the supports formed on the button attachment hole.

More preferably, the manipulation button has supporting pins at mutually opposed positions on the perimeter thereof, and also has first and second button pressers on the left-hand and right-hand sides of a line linking the supporting pins. A spring having flexible parts as the left-hand and right-hand parts thereof and having the center thereof aligned with an extension of the axial line linking the supporting pin is placed on the perimeter of the manipulation button. The supporting pins are fitted into the supports formed on the perimeter of the button attachment hole so that the manipulation button can slide, whereby the manipulation button is attached to the case. The center of the spring is locked in the case. When the manipulation button is pressed, the spring is distorted. When the manipulation button is released, the manipulation button is reset with a movement made by the spring to return to an original state.

More preferably, the manipulation button is circular, and made of a resin material such as ABS or PS, a carbon fiber reinforced resin material, a liquid-crystal polymer, a polypropylene material, a polyester material, or a polycarbonate material.

More preferably, the spring of the manipulation button is made of the same material as the manipulation button, and molded as part of the manipulation button.

BRIEF DESCRIPTION OF THE DRAWINGS

FIG. 8 shows a state in which the manipulation button is not moved, FIG. 9 show a distortion of an arm member utilized to exert a returning force, and FIG. 10 shows elastically deformed states of convex parts for receiving an arm member in which a returning force is exerted;

BEST MODE OF CARRYING OUT THE INVENTION

Problems in the prior arts will be described before mention is made of embodiments of the present invention. The aforesaid prior arts each have problems. The mechanism adapted for a switch manipulator in many prior arts and the problems lying in the mechanism will be described in conjunction with the drawings below.

Figure 28:
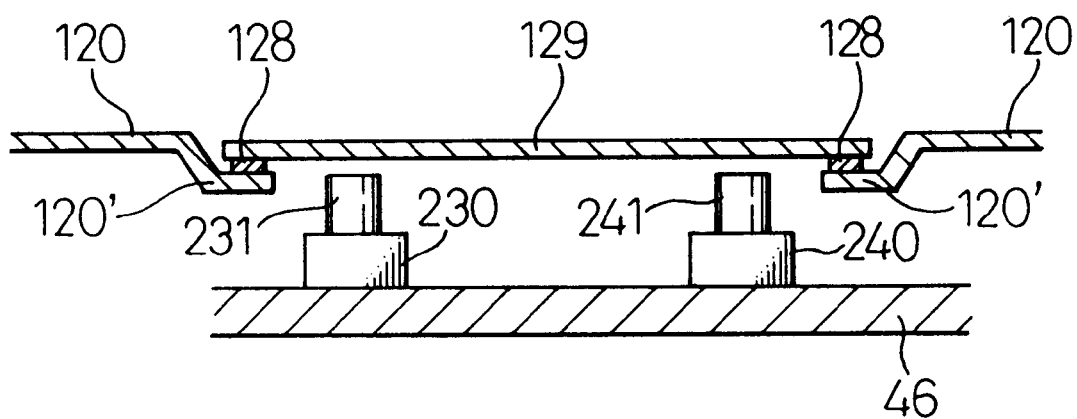
FIGS. 28 and 29 are sectional views showing the structure of a major portion of a conventional switch manipulator.
Figure 29:
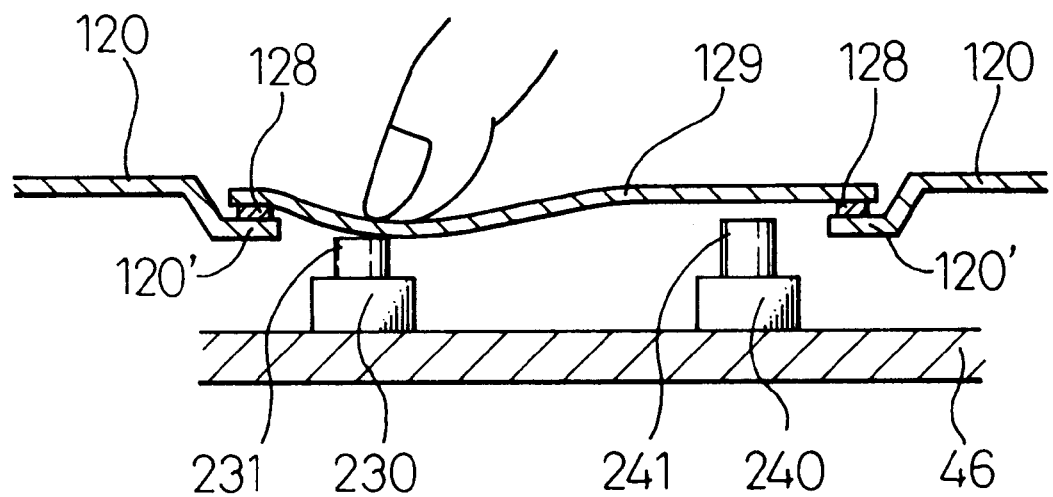

FIGS. 28 and 29 are sectional views showing the structure of a major potion of a conventional switch manipulator. FIGS. 28 and 29 show a section of a liquid-crystal display apparatus shown in FIG. 1, which will be described later, in which a prior art is implemented. FIG. 29 shows a state in which a channel tuning switch sheet button 129 is pressed in order to tune a channel of a television set. FIG. 28 shows a state in which no channel of the television set is tuned.

A first switch 230 and second switch 240 for use in tuning a channel are soldered to a control circuit substrate 46. A circuit for producing signals used to control drive circuits mounted on a liquid-crystal panel is mounted on the control circuit substrate 46. An upper case 120 (See FIG. 1) located above the first and second switches 230 and 240 has a concave part 120'. An area inside the concave part is cut out as illustrated. A channel tuning switch sheet button 129 is placed on the concave part so that the sheet button can cover the cutout. The channel tuning switch sheet button 129 is attached and fixed to the concave part using a pressure sensitive adhesive double-coated tape 128.

The conventional switch manipulator used to tune a channel has a problem in that since the channel tuning switch sheet button 129 is, as shown in FIG. 29, pressed with a finger, it is hard to define a gap between the channel tuning switch sheet button 129 and a first switch manipulation terminal 231 formed as part of the first switch 230 or a gap between the channel tuning switch sheet button 129 and a second switch manipulation terminal 241 formed as part of the second switch 240.

Specifically, if the gap between the channel tuning switch sheet button 129 and first switch manipulation terminal 231 or the gap between the channel tuning switch sheet button 129 and second switch manipulation terminal 241 were too large, either of the switches could be actuated with a press made on the channel tuning switch sheet button 129. Unless the channel tuning switch sheet button 129 is pressed with a strong force, either of the switches will not be actuated. By contrast, if the gap were too small, either of the switches would be moved with even a slight touch made on the channel tuning switch sheet button 129.

It is hard to define gaps optimally, as shown in FIG. 28, in the course of manufacturing. Even when the gaps are defined optimally, the material of the channel tuning switch sheet button 129 deteriorates with user's repeated use. As a result, there arises a problem that the channel tuning switch sheet may be turn out, the operability may deteriorate or contact may become imperfect.

According to the aforesaid publications that have disclosed the prior arts, after the channel tuning switch sheet button 129 is pressed, a recovering force exerted by an elastic member made of rubber or the like, a returning force exerted by a tactile switch, or both a recovering force exerted by a channel tuning switch sheet button and a returning force exerted by an individual switch are utilized for resetting the channel tuning switch sheet button 129. However, this leads to an increase in number of parts. Moreover, the recovering force exerted by a material or the returning force exerted by a switch varies. For this reason, it is hard to ensure stable performance despite mass-production carried out with consideration given to manufacturing cost.

An object of the present invention is to provide a switch manipulator having a mechanism in which gaps can be defined easily and a stable returning force can be exerted, and which can be mass-produced efficiently at low cost and can be easily maintained, and offering excellent operability, and to provide a liquid-crystal display apparatus having the switch manipulator.

An embodiment of the present invention will be described below.

Figure 1:
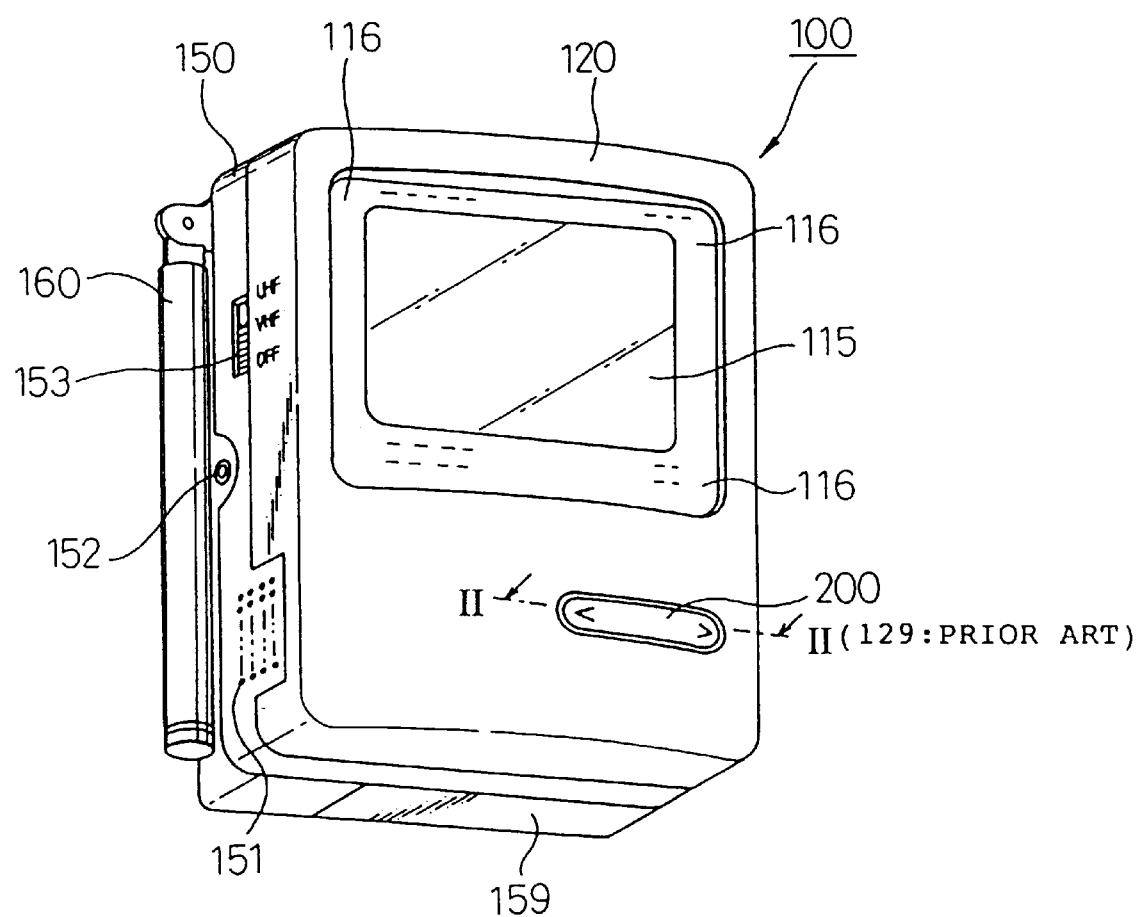
FIG. 1 is an oblique diagram showing the appearance of a liquid-crystal display apparatus to which a switch manipulator in accordance with the first embodiment of the present invention is adapted.

FIG. 1 is an oblique view showing the appearance of a liquid-crystal display apparatus to which a switch manipulator in accordance with the first embodiment of the present invention is adapted, wherein the liquid-crystal display apparatus is a portable liquid-crystal television set.

In FIG. 1, the liquid-crystal display apparatus 100 has an upper case 120 that is a front case and a lower case 150 that is a back case. A liquid-crystal panel that is a display, a control circuit substrate on which a circuit for controlling and driving the liquid-crystal panel is mounted, a television reception circuit, and an illumination unit for illuminating the liquid crystal panel from below are stowed as major components inside the cases.

The illumination unit is incorporated in the liquid-crystal display apparatus in order to make a display on the liquid-crystal panel brighter and clearer. An under-liquid crystal type illumination unit having a light source placed immediately under a liquid-crystal panel or a side-light type illumination unit having a light source at a lower position by the side of the liquid-crystal panel and capable of being designed thinner than the under-liquid crystal type illumination unit can be adopted as the illumination unit.

Incidentally, a reflection type liquid-crystal display apparatus for making images discernible to a viewer by reflecting extraneous light transmitted by a liquid-crystal panel is also available.

The switch manipulator in accordance with the present invention can be adapted to either type of liquid-crystal display apparatus. For brevity's sake, the description will proceed in relation to the liquid-crystal display apparatus having an under-liquid crystal type illumination unit therein.

As illustrated, an antenna 160 used to receive a television signal is located on the left side of the liquid-crystal display apparatus 100. Arranged on the same side of the liquid-crystal display apparatus as the antenna 160 are a switch 153 for turning on or off the power supply of the liquid-crystal display apparatus and for switching VHF and UHF channels, a power input terminal 152 that is an input terminal through which power supplied from an AC adaptor or car adaptor is input, and a sound discharge hole 151 through which the sound of a speaker is discharged outside the liquid-crystal display apparatus 100.

On the bottom of the liquid-crystal display apparatus 100, a battery lid 159 for closing a battery chamber for a battery used to drive the liquid-crystal display apparatus 100 is located. On the face of the upper case 120, a wind-proof member 15 for protecting the liquid-crystal panel and preventing dust from entering the inside of the liquid-crystal display apparatus is placed. The wind-proof member 115 has a printed portion containing printed indicators. Furthermore, a switch manipulator (manipulation button 200) used to tune a television reception channel is provided. In FIG. 1, the manipulation button 200 of the present invention is, as illustrated, hardly differentiated from the channel tuning switch sheet button 129 having described in conjunction with FIGS. 28 and 29 in terms of appearance. The reference numeral 129 is therefore written in parentheses.

Figure 2:
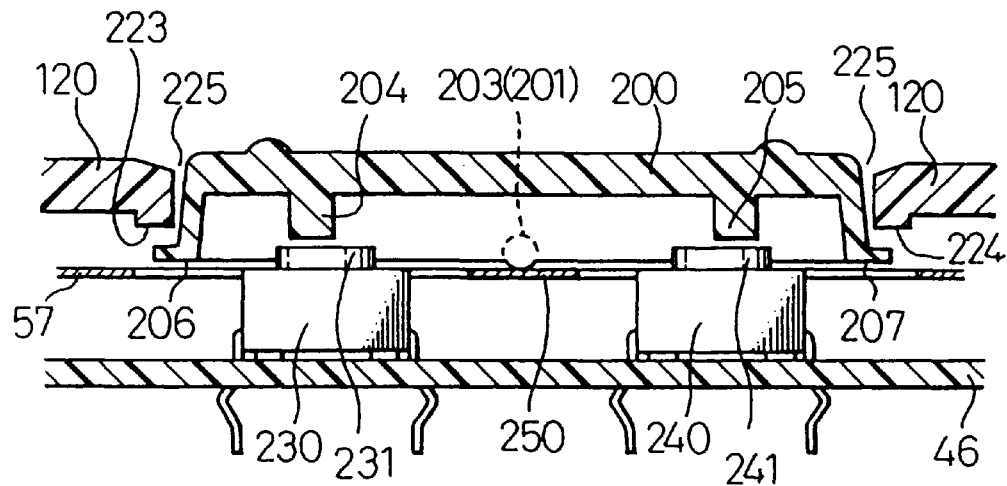
FIG. 2 is a sectional view of the switch manipulator on line II—II in FIG. 1.
Figure 3:
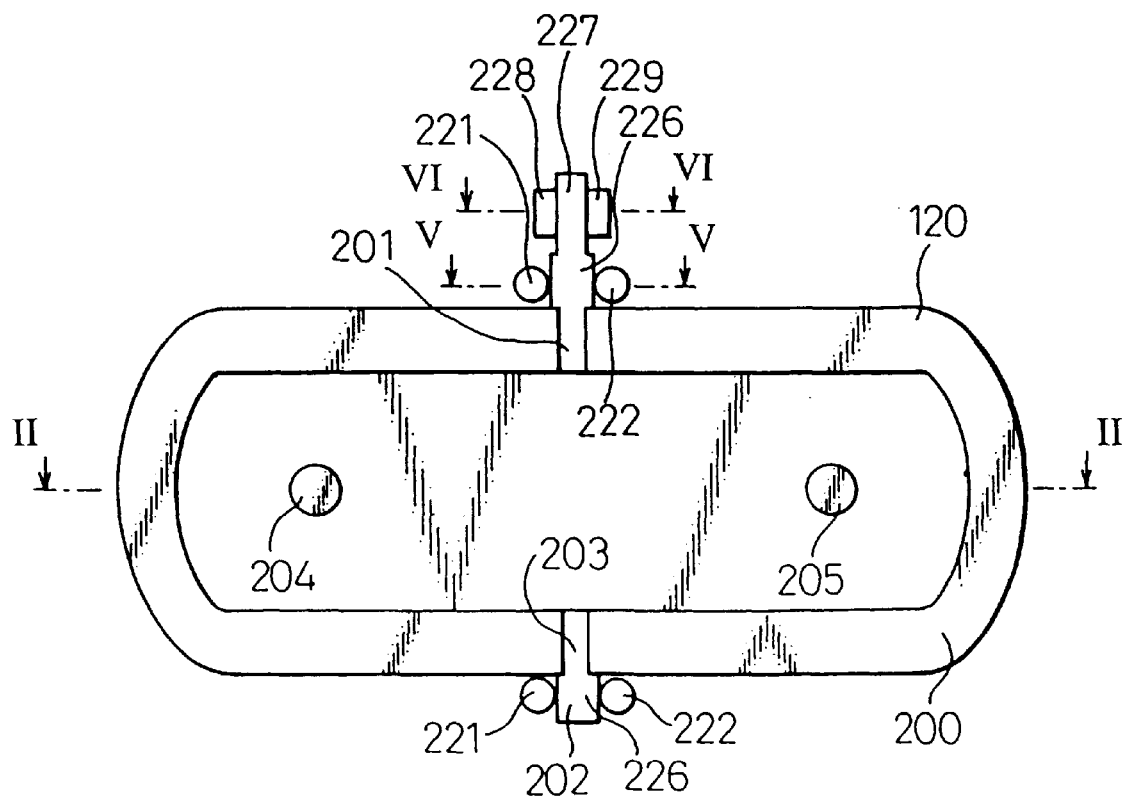
FIG. 3 is a plan view showing the switch manipulator in FIG. 1 from the inside of the apparatus, and explaining a state in which a manipulation button is supported with arm members.
Figure 4:
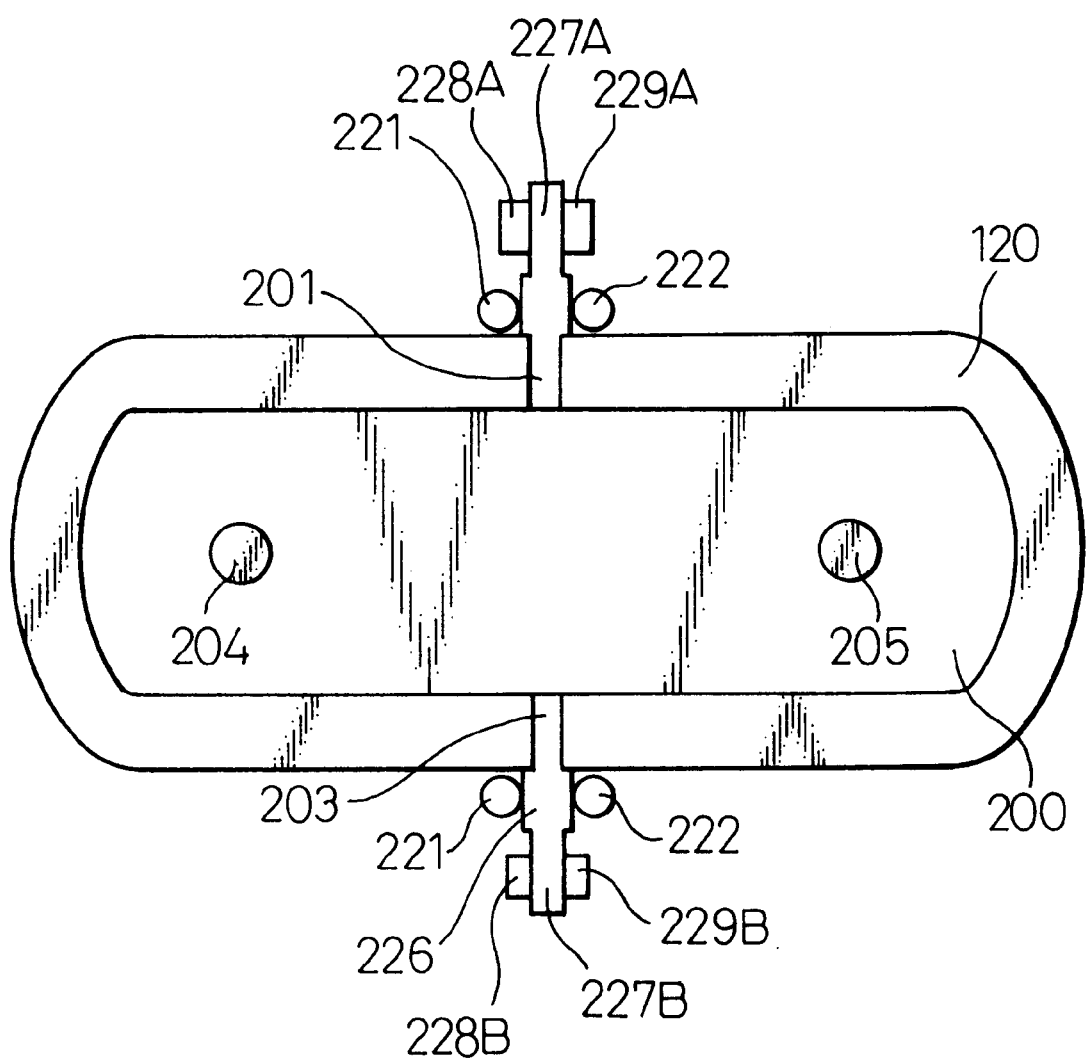
FIG. 4 is a plan view of another example of the switch manipulator shown in FIG. 3 for explaining a supported state of the manipulation button having arm members on both sides thereof.
Figure 5:
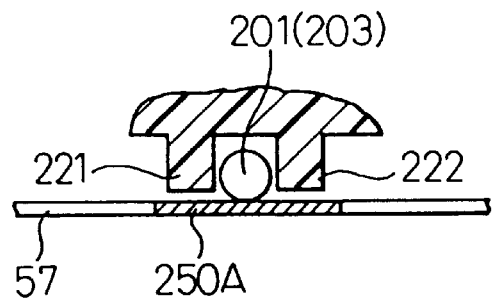
FIG. 5 is a sectional view of the switch manipulator taken on line V—V in FIG. 3 for explaining a state in which an arm member is supported by an arm member receptor.
Figure 6:
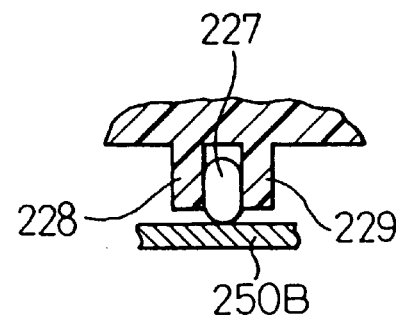
FIG. 6 is a sectional view of the switch manipulator taken on line VI—VI in FIG. 3 for explaining a state in which an arm member is clamped by an arm member clamp.
Figure 7:
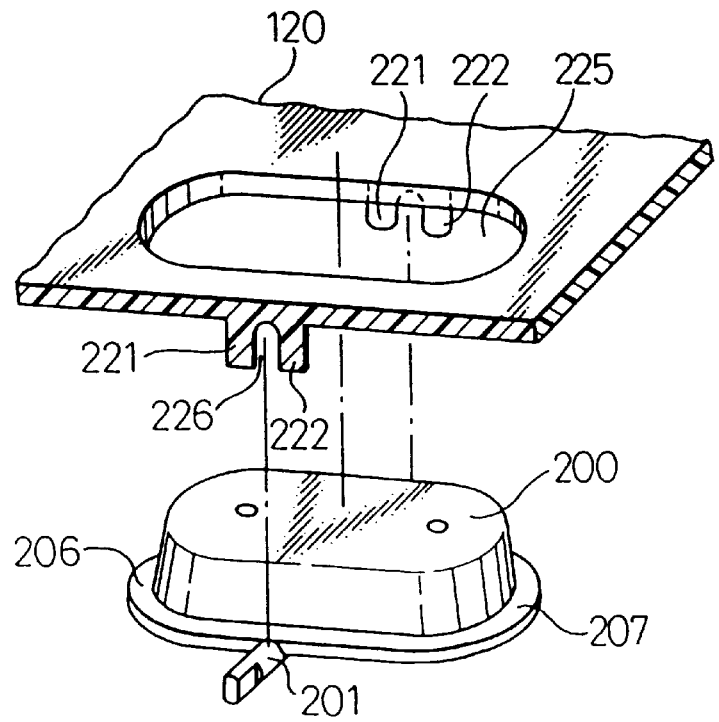
FIG. 7 is an exploded oblique view of the switch manipulator shown in FIG. 2.
Figure 8:
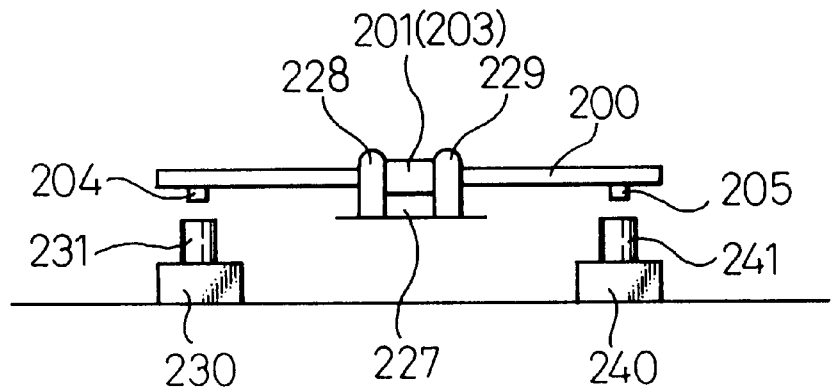
FIGS. 8, 9, and 10 are explanatory diagrams for explaining the movement of the switch manipulator in accordance with the first embodiment of the present invention.
Figure 9:
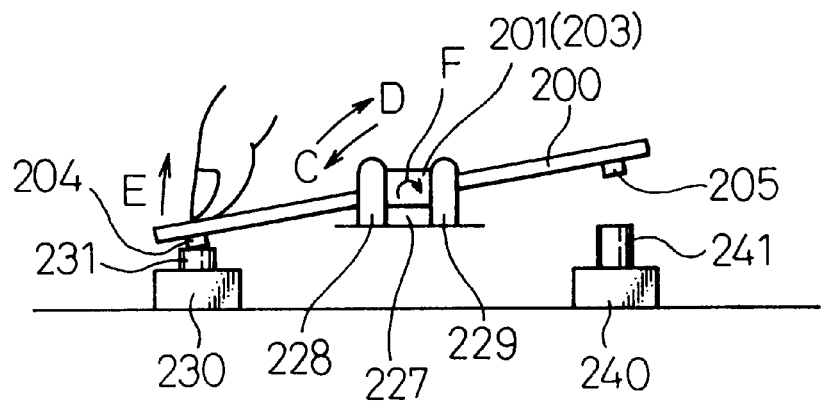
Figure 10:
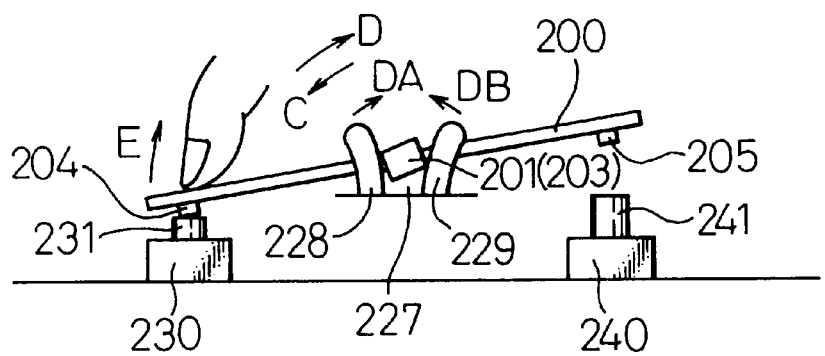

The switch manipulator in the liquid-crystal display apparatus shown in FIG. 1 will be described, with reference to the drawings, below. FIG. 2 is a sectional view of the switch manipulator shown in FIG. 1. FIG. 3 is a plan view showing the switch manipulator in FIG. 1 from the inside of the apparatus for explaining a supported state of the manipulation button with arm members to be described later. FIG. 4 is a plan view of another example of the switch manipulator shown in FIG. 3 for explaining a supported state of the manipulation button having arm members located on both sides thereof with respect to substantially the center thereof and clamped by two arm member clamps. FIG. 5 is a sectional view of the switch manipulator shown in FIG. 3 showing a state in which an arm member is supported by an arm member receptor. FIG. 6 is a sectional view of the switch manipulator shown in FIG. 3 showing a state in which an arm member is clamped by an arm member clamp. FIG. 7 is an exploded oblique view showing a major portion of the switch manipulator shown in FIG. 2. FIGS. 8, 9, and 10 are explanatory diagrams for explaining the movement of the switch manipulator of the present invention. FIG. 8 shows a state in which the manipulation button is not moved, FIG. 9 shows a distorted state of an arm member in which a returning force is exerted, and FIG. 10 shows the elastically deformed states of convex parts for receiving an arm member in which a returning force is exerted.

The switch manipulator in accordance with the first embodiment of the present invention will be described below. As mentioned above, the manipulation button 200 of a seesaw type having the structure shown in FIG. 2 is placed in a manipulation button insertion area 225 of the upper case 120 of the liquid-crystal display apparatus in FIG. 2.

In FIG. 2, a first switch 230 and second switch 240 are located under the manipulation button 200 and mounted on a control circuit substrate 46. In this case, a first switch manipulation terminal 231 attached to the first switch 230 is opposed to a first button presser 204 of the manipulation button 200. A second switch manipulation terminal 241 attached to the second switch 240 is opposed to a second button presser 205 of the manipulation button 200.

The manipulation button 200 has a flange (parts of which are denoted with 206 and 207) along an outer circumference thereof. Owing to the flange, the gap between the manipulation button insertion area 225 of the upper case 120 and the manipulation button 200 is hidden. Furthermore, the flange prevents light emanating from the illumination unit incorporated in the liquid-crystal display apparatus from leaking out through the gap.

A first flange portion 206 and second flange portion 207 are located in the longitudinal direction of the manipulation button 200. A first receiving portion 223 and second receiving portion 224 of the upper case 120 are located on the side of the switches and opposed to the flange portions. When the manipulation button 200 is moved in a direction in which the second switch 240 is pressed, the first flange portion 206 abuts on the first receiving portion 223. When the manipulation button 200 is moved in a direction in which the first switch 230 is pressed, the second flange portion 207 abuts on the second receiving portion 224.

Figure 27:
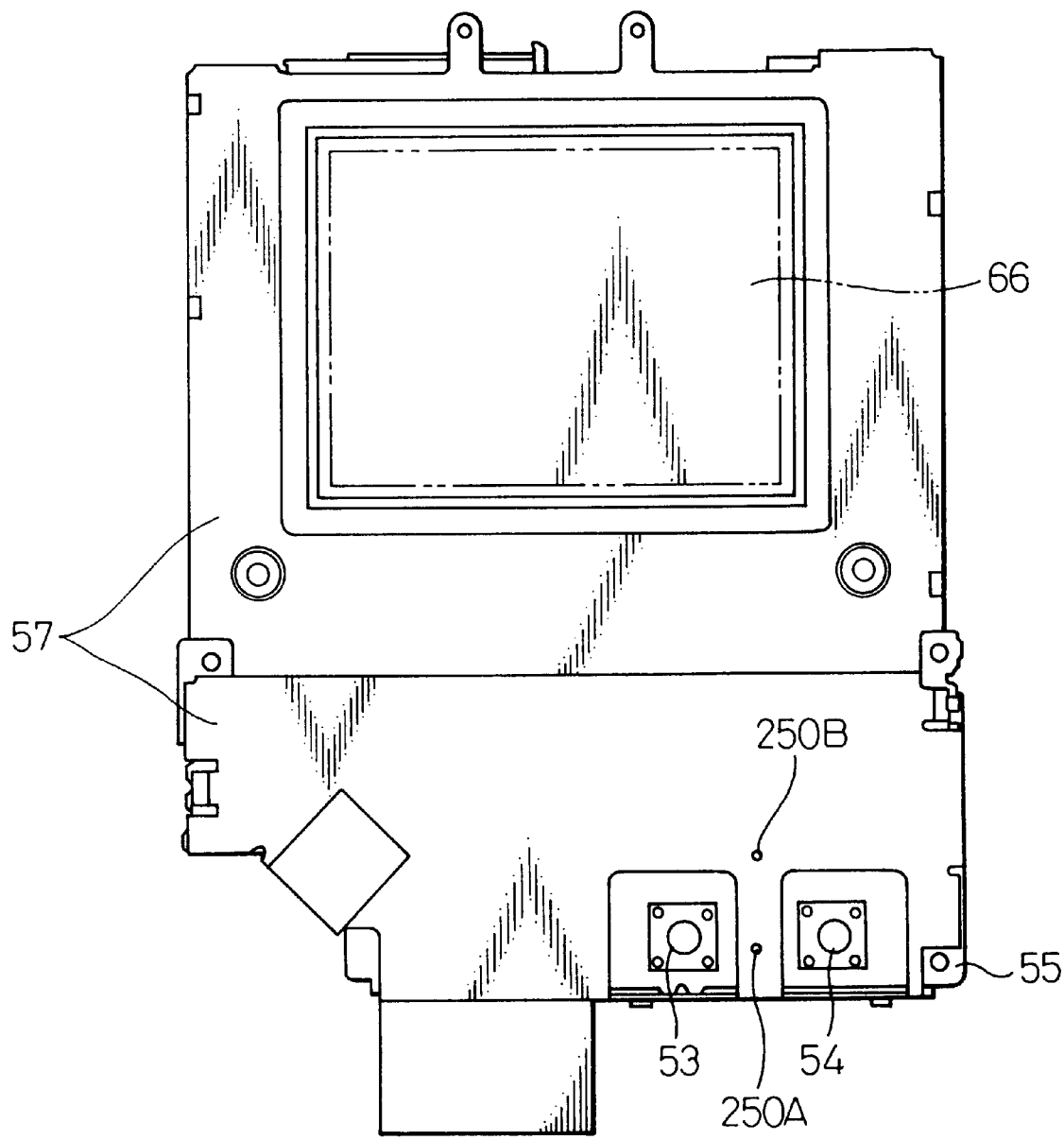
FIG. 27 is a plan view with a panel shielding plate attached to a liquid-crystal panel.

Furthermore, an arm member supporting member 250 is part of a shield plate 57 as indicated with reference numerals 250A and 250B in FIG. 27. As shown in FIG. 3 and other drawings, arm members 201 and 203 are supported by the arm member supporting member 250.

In FIGS. 3 and 4, the arm members 201 and 203 are molded as parts of the manipulation button 200. The detailed shape of the arm members is also shown in FIGS. 5, 6, and 7. Pairs of first convex members 221 and second convex members 222 jutting from the upper case are, as shown in FIG. 7, molded as arm member receptors while jutting down from the upper case 120 parallel to each other. A third convex member 228 and fourth convex member 229 are molded as an arm member clamp while jutting down from the upper case 120 parallel to each other. In this embodiment, the arm members 201 and 203 are clamped by the first and second convex members 221 and 222 of the upper case. The precision in position of the manipulation button 200 is thus ensured. The third and fourth convex members 228 and 229 constitute, as shown in FIG. 6, an arm member clamp 227.

According to the present invention, the third and fourth convex members 228 and 229 constitute the arm member clamp 227. Owing to this structure, when the manipulation button 200 tilts to the left or right (hereinafter, makes a seesaw movement), the arm members 201 and 203 are distorted. A force exerted by each arm member to recover from the distorted state is used to reset the switch manipulator. FIG. 4 shows another example of FIG. 3. The structure of the arm member clamp shown in FIG. 3 is formed at positions coincident with both the arm members or on both sides of the manipulation button. Since both the arm members are thus clamped and distorted, the manipulation button is fixed more strongly and can be moved more stably than it is in the state shown in FIG. 3.

To be more specific, first convex members 221 and second convex members 222 each pair of which are parallel to each other jut from the upper case 120 and constitute arm member receptors 226. Each pair of the first convex members 221 and second convex members 222 is supporting the first arm member 201 or second arm member 203 of the manipulation button 200 with a gap between the first convex member and second convex member and the first or second arm member. In this embodiment, the first arm members 201 and second arm members 203 are shaped like cylinders. The arm member supporting member 250 is located under the arm members 201 and 203, thus supporting the arm members 201 and 203 and also supporting the manipulation button 200 (See FIG. 5). Since the switch manipulator has a seesaw switch type structure that is the manipulation button, the operability of the switches improves.

Furthermore, the upper case 120 has third convex members 228 and fourth convex members 229 as arm member clamps 227 at positions coincident with the distal ends of the arm members 201 and 203. The distal ends of the arm members 201 and 203 are therefore clamped by the arm member clamps 227. As a result, when the manipulation button 200 is manipulated, the arm members 201 and 203 are distorted.

Preferably, the portions of the arm members 201 and 203 clamped by the arm member clamps 227, 227b (that is, the distal portions of the arm members 201 and 203) have, as shown in FIGS. 6 and 7, a double D-cut section.

Next, a seesaw movement made by the manipulation button 200 and returning forces exerted by the arm members 201 and 203 to return from a distorted state will be described below.

FIGS. 8, 9, and 10 are explanatory diagrams concerning the seesaw movement made by the manipulation button 200 and the distorted state of an arm member. As shown in FIG. 8, when a channel tuning movement is not made, the manipulation button 200 is retained substantially in an even state. Owing to returning forces exerted by the arm members 201 and 203, even if the first button presser 204 comes into contact with the first switch manipulation terminal 231, the contact force is too weak to move the first switch manipulation terminal 231. Since the sections of the distal ends of the arm members are double D-cut, each arm member is placed substantially parallel to the mutually opposed surfaces of the two convex members 228 and 229, and the distal end of the arm member is fitted into the space defined between the mutually opposed surfaces of the two convex members 228 and 229 (the space is caulked).

As shown in FIG. 9, when the manipulation button 200 is pressed with a finger in order to carry out a channel tuning operation, the manipulation button 200 tilts in the direction of arrow C. When the manipulation button 200 tilts, the first button presser 204 pushes down the first switch manipulation terminal 231 of the first switch 230. This causes the first switch 230 to operate. At this time, since the arm member clamp 227 is nearly fixed, the arm members 201 and 203 are internally distorted.

When the manipulation button 200 is released, that is, when the switch is turned off, the manipulation button 200 moves in a direction of arrow D due to a force exerted in a direction of arrow E with a returning force exerted by the first switch 230, and a recovering force F exerted by the arm member 203 distorted toward the manipulation button 200 from the position of the clamp, to recover from the distorted state. Consequently, the manipulation button 200 is reset to the state shown in FIG. 8.

When the third convex member 228 and fourth convex member 229 constituting the arm member clamp 227 are, as shown in FIG. 10, pushed apart, if the manipulation button 200 is released, the manipulation button is reset to the state shown in FIG. 8 owing to a force exerted in a direction of arrow E due to a returning force exerted by the first switch 230, and a returning force exerted in a direction of arrow D and composed of a bounding force DA exerted in an arrow direction by the third convex member 228 and a bounding force DB exerted by the fourth convex member 229.

Owing to the foregoing structure, when the manipulation button 200 is pressed or released, a touch in manipulating a switch or a touch in clicking a switch will improve greatly. Preferably, the manipulation button 200 is made of a resin material such as ABS or PS, a carbon fiber reinforced resin material, a liquid-crystal polymer, a polypropylene material, a polyester material, or a polycarbonate material, and is injection-molded together with the arm members.

The preferable dimensions of the switch manipulation are such that a stroke of the first and second switches is 0.25 mm, the distance from the center of an arm member to the center of the first or second switch is about 7 mm, and an angle with respect to an even state in which a switch is not operated ranges from 3.5° to 5°.

The embodiment of the present invention has been described in relation to the switch manipulator used to turn on or off a channel tuning switch for carrying out a channel tuning operation in a liquid-crystal television set. The present invention can apply to any other switching mechanism and provide the same advantage as the one described above.

Next, a switch manipulator in accordance with the second embodiment of the present invention will be described in conjunction with the drawings.

Figure 11:
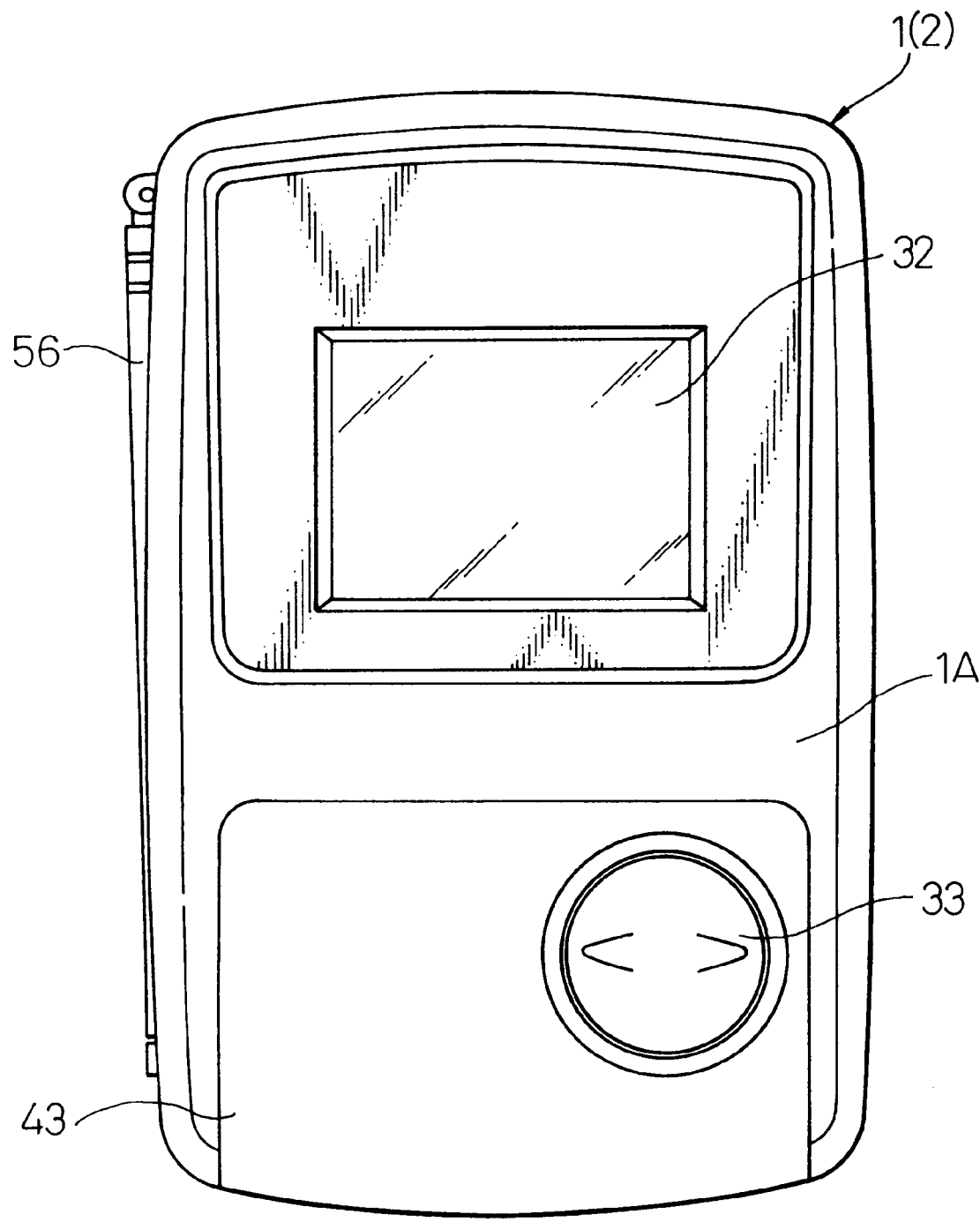
FIG. 11 is a diagram showing the appearance of a liquid-crystal display apparatus to which a switch manipulator in accordance with the second embodiment of the present invention is adapted.
Figure 12:
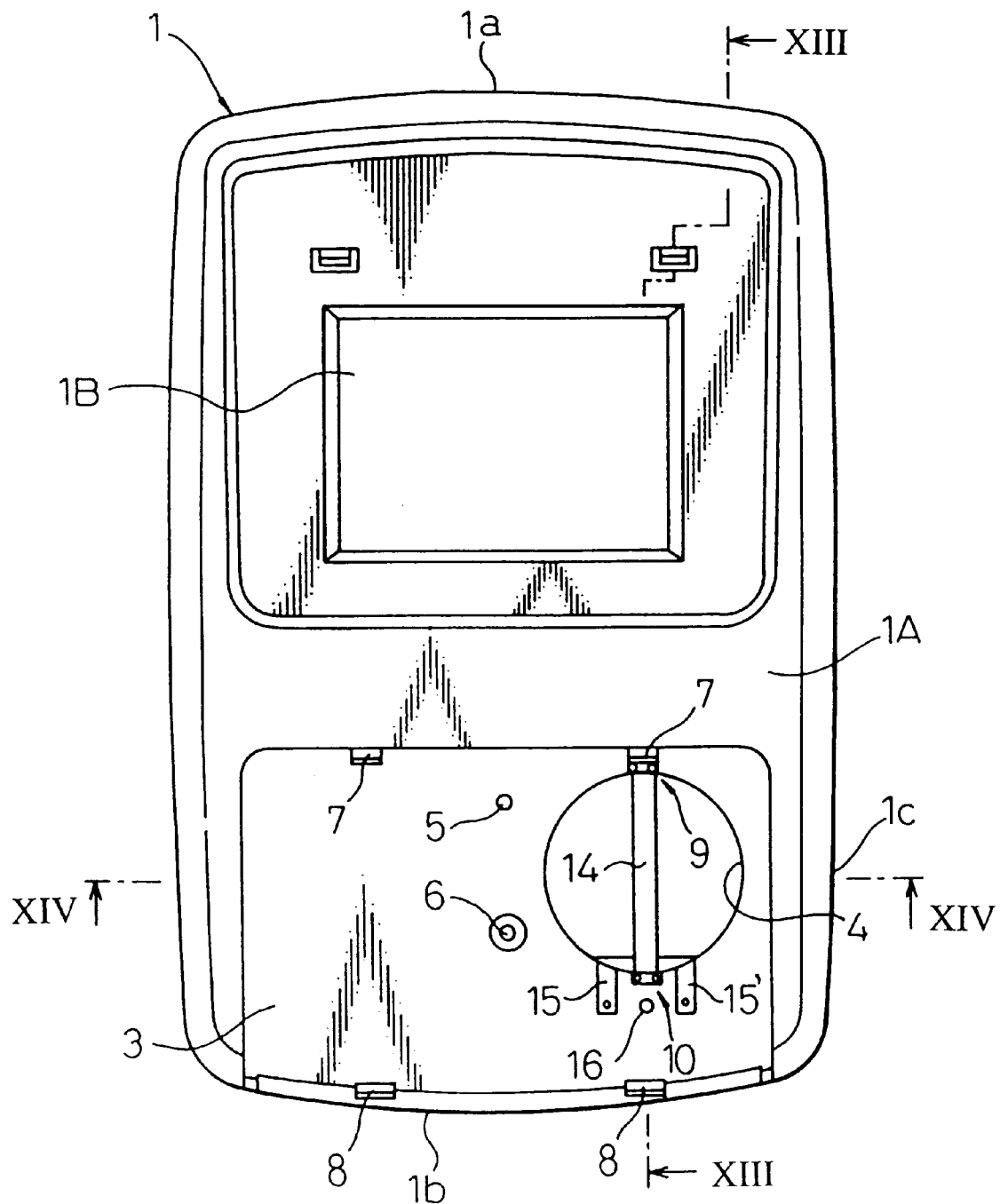
FIG. 12 is a plan view with a wind-proof member, decorative frame, and manipulation button removed from an upper case shown in FIG. 11.

FIG. 11 is a plan view of a liquid-crystal display apparatus in accordance with the second embodiment of the present invention. FIG. 12 is a plan view showing the liquid-crystal display apparatus with a wind-proof member 32, decorative frame 43, and manipulation button 33 removed from an upper case 1. The manipulation button 33 in this embodiment is, as illustrated, circular. Despite the circular shape, the manipulation button 33 has a seesaw structure as described below.

As illustrated, stowed in a case composed of an upper case 1 and a lower case 2, which is not shown, forming a back of the liquid-crystal display apparatus are a liquid-crystal panel 66 (See FIG. 27) that is a display, a control circuit substrate 55 (See FIG. 27) having a control circuit for driving and controlling the liquid-crystal panel, a reception control circuit substrate on which a signal processing circuit for carrying out signal processing by reshaping the waveforms of signals sent from various control switches and the waveform of a signal sent from a variable resistor and used for controlling luminance, and a reception circuit for receiving and processing a radio-frequency television signal are mounted, and an illumination unit for illuminating the liquid-crystal panel 66 from below.

Similarly to the liquid-crystal display apparatus shown in FIG. 1, an antenna 56 used to receive a television signal, a switch (See FIG. 1) used to turn on or off the power supply of the liquid-crystal display apparatus and switching VHF and UHF channels, a power input terminal (See FIG. 1) through which power is supplied externally, and a sound discharge hole (See FIG. 1) through which the sound of a speaker is discharged outside the liquid-crystal display apparatus are arranged on a side of the liquid-crystal display apparatus.

Figure 13:
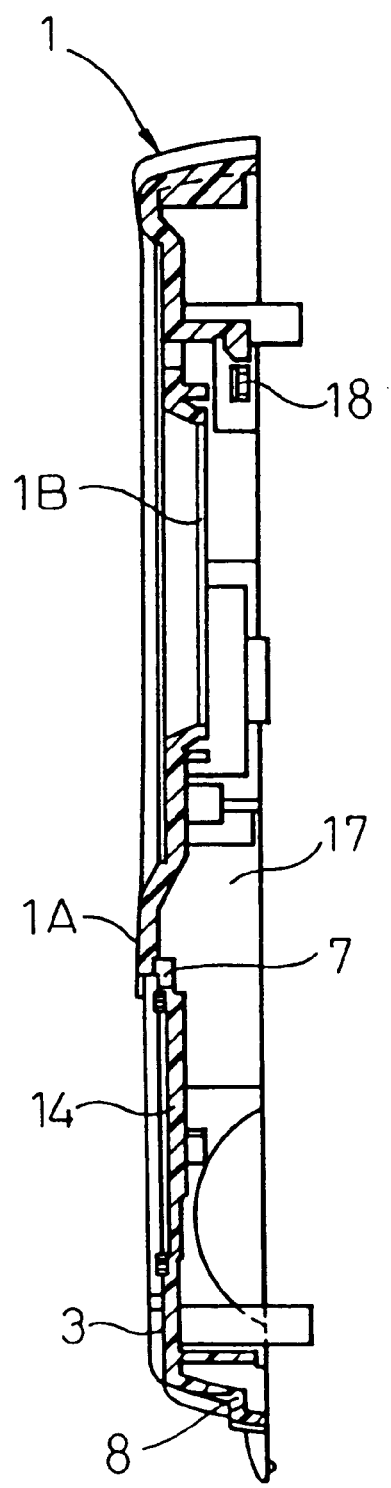
FIG. 13 is a sectional view of the upper case taken on line XIII—XIII in FIG. 12.
Figure 14:
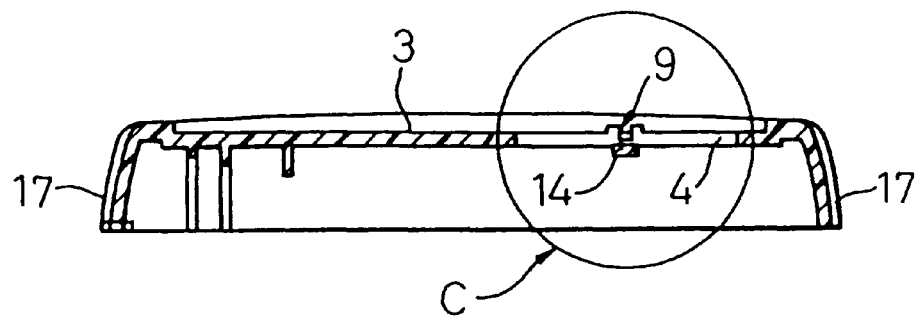
FIG. 14 is a sectional view of the upper case taken on line XIV—XIV in FIG. 12.
Figure 15:
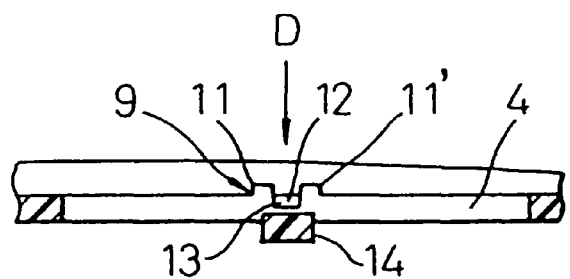
FIG. 15 is an enlarged view of area C in FIG. 14.
Figure 16:
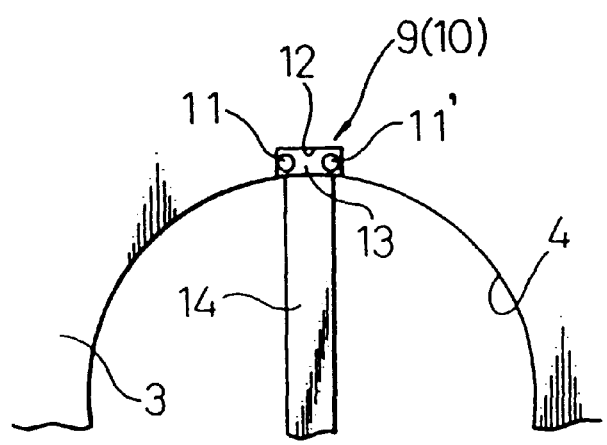
FIG. 16 is a plan view showing a major portion of area C in direction D in FIG. 15.
Figure 24:
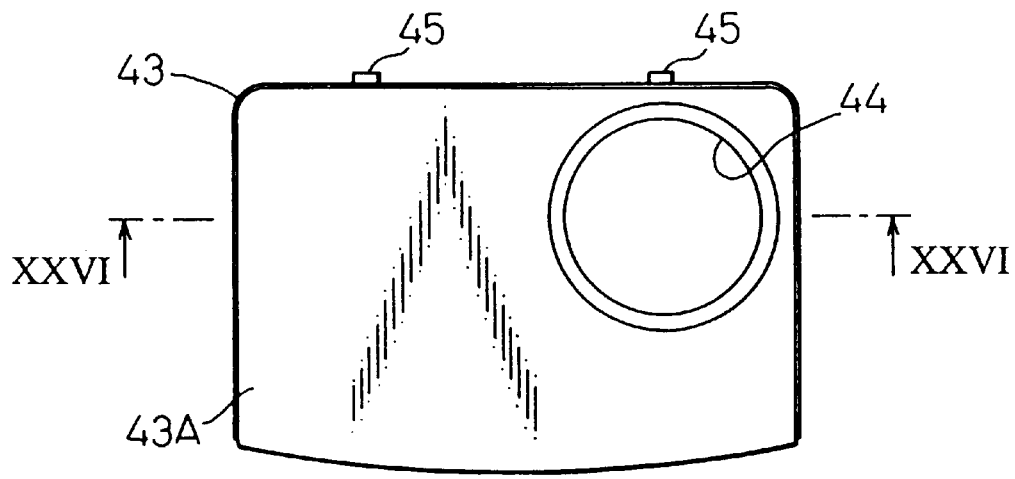
FIG. 24 is a plan view of the decorative frame shown in FIG. 11.
Figure 25:
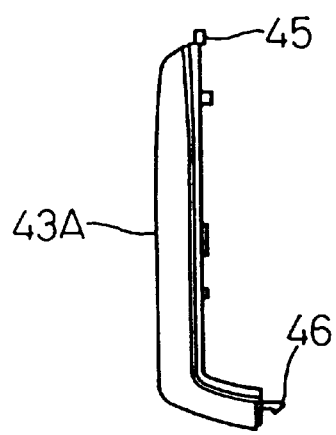
FIG. 25 is a side view of the decorative frame.
Figure 26:
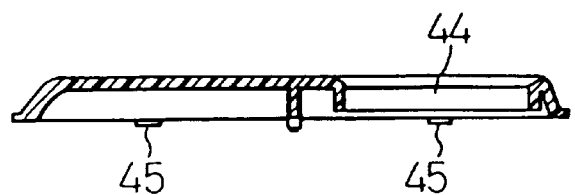
FIG. 26 is a sectional view of the decorative frame taken on line XXVI—XXVI in FIG. 24.

FIG. 13 is a sectional view of the liquid-crystal display apparatus shown in FIG. 12, FIG. 14 is a sectional view of the liquid-crystal display apparatus shown in FIG. 12, FIG. 15 is an enlarged view of area C in FIG. 14, and FIG. 16 is a plan view showing a major portion of area C in a direction D in FIG. 15. FIG. 24 is a plan view of the decorative frame, FIG. 25 is a side view of the decorative frame, and FIG. 26 is a sectional view of the decorative frame shown in FIG. 24. FIG. 27 is a plan view of the liquid-crystal display apparatus with a panel shielding plate attached to the liquid-crystal panel.

As shown in FIG. 12, the upper case 1 has a rectangular display window 1B located near one end 1a in the longitudinal direction of the case beyond the center of the surface 1A of the upper case, and a decorative frame attachment area 3 located near the other end 1b in the longitudinal direction of the case on the surface 1A. The decorative frame attachment area 3 has a circular button attachment hole 4 located near one end 1c in the lateral direction of the case. An engagement hole 5 into which an engagement pin located on the decorative frame 43 is fitted, and a screw hole 6 used to screw the decorative frame 43 to the upper case 1 are bored in the center of the decorative frame attachment area 3. In the decorative frame attachment area 3, a pair of engagement holes 7 are bored on the side of the one end 1a in the longitudinal direction of the case and a pair of engagement holes 8 are bored on the side of the other end 1b in the longitudinal direction of the case.

As mentioned above, the screw hole 6 is bored in order to screw the decorative frame 43 to the upper case 1. Whether or not the decorative frame and upper case are screwed together is determined by the design specifications. That is to say, the decorative frame 43 is supported by the upper case 1 via a locking projection 45 and locking projection 46 (See FIG. 25). In case of a trouble such as damage or breakage, the decorative frame 43 or manipulation button 33 can be replaced with a new one readily from the face of the liquid-crystal display apparatus. However, the use situation of the liquid-crystal display apparatus may be very bad depending on the environment. In this case, if the decorative frame 43 is locked with the locking means, the decorative frame 43 may be detached. The screw hole 6 is therefore used to screw the decorative frame 43 to the upper case 1.

On the perimeter of the button attachment hole 4, supports 9 and 10 are formed on both ends (12 o'clock and 6 o'clock positions) in the longitudinal direction of the case. The supports 9 and 10 are each, as shown in FIGS. 15 and 16, composed of left and right convex parts 11 and 11' and a ditch 13 defined with the convex parts 11 and 11' and an end wall 12. A reinforcement rib 14 serving as a support links the supports 9 and 10.

The decorative frame attachment area 3 has a pair of grooves 15 and 15' extending in the longitudinal direction of the case on the left-hand and right-hand sides of the support 10 formed on the button attachment hole 4. An engagement pin 16 is interposed between the grooves 15 and 15'. As shown in FIG. 13, a plurality of locking projections 18 are formed on the left and right inner surfaces of a circumferential wall 17 of the upper case 1.

Figure 21:
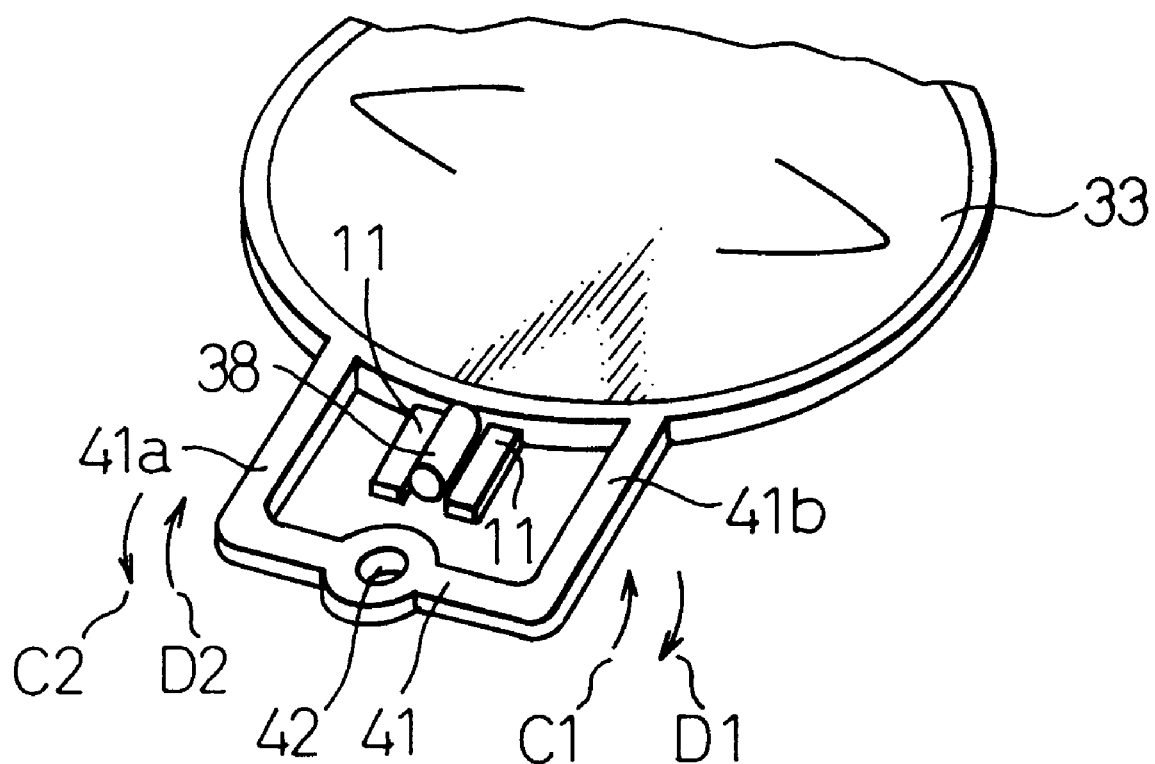
Figure 22:
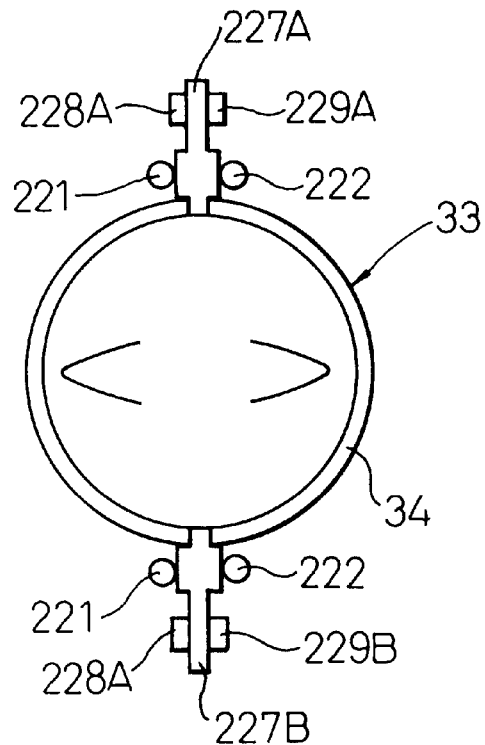
FIGS. 22 and 23 are diagrams (part 2) showing the detailed structure of the manipulation button shown in FIG. 11.
Figure 23:
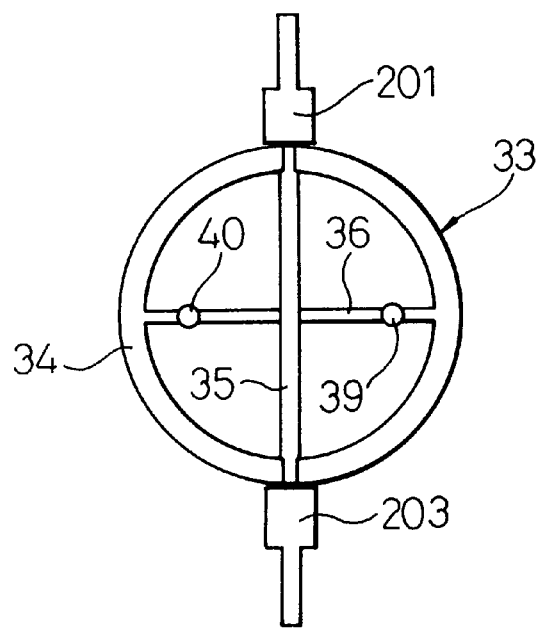

FIGS. 17 to 23 show the detailed structure of the manipulation button 33 in accordance with the second embodiment. FIGS. 17 to 21 show the first example, and FIGS. 22 and 23 show the second example. As shown in FIGS. 11 and 12, the button attachment hole 4 is covered with the manipulation button 33 used to tune a channel. The manipulation button 33 has, as shown in FIGS. 17 to 23, a circular flange 34 on the back thereof. Moreover, a vertical rib 35 and lateral rib 36 cross on the back.

Furthermore, supporting pins 37 and 38 jut from extensions of the vertical rib 35 on the perimeter of the flange 34. First and second button pressers 39 and 40 are molded as parts of the lateral rib 36 on the left-hand and right-hand sides of the vertical rib 35. The first and second button pressers 39 and 40 jut from the edge of the lateral rib 36. For operating a switch, a first or second switch 53 or 54 is pressed by the first or second button presser.

Figure 17:
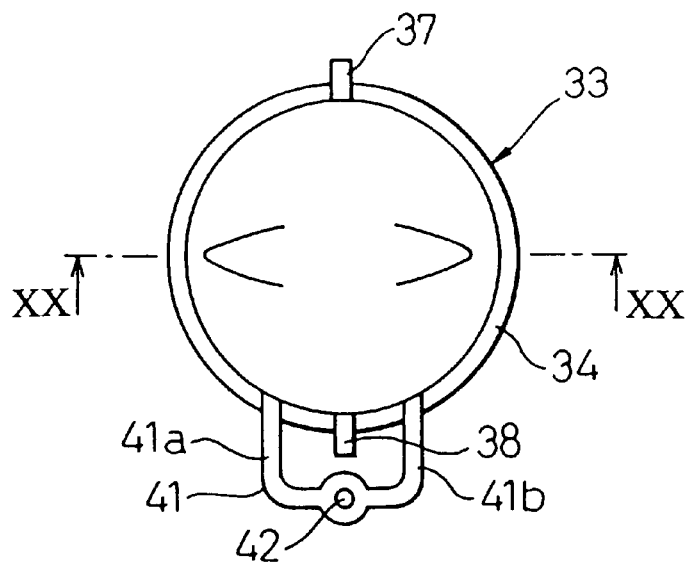
FIGS. 17 to 21 are diagrams (part 1) showing the detailed structure of the manipulation button shown in FIG. 11.
Figure 18:
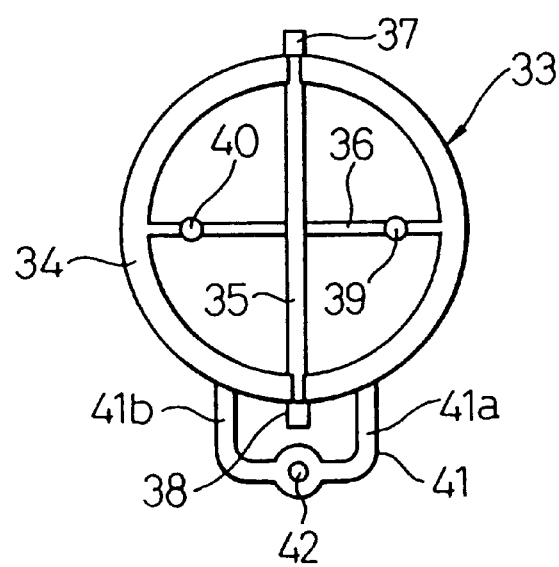
Figure 19:
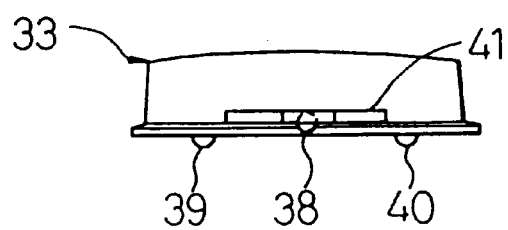
Figure 20:
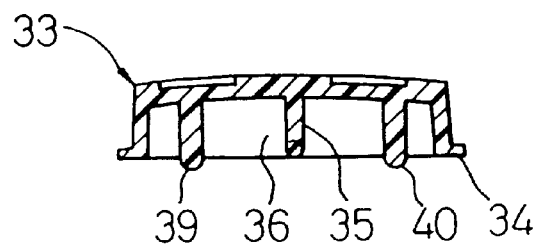

On the perimeter of the flange 34, a spring 41 that looks like a letter U in a plan view is united with the manipulation button 33 with the center of the spring aligned with an extension of the axial line of the supporting pin 38 (See FIGS. 17, 18, and 21). The spring 41 is shaped like a thin plate. The left and right parts of the spring are flexible parts 41a and 41b, and the center part thereof has an engagement hole 42.

The manipulation button 33 has the supporting pins 37 and 38 thereof inserted into the ditch 13 of the supports 9 and 10 formed on the perimeter of the button attachment hole 4 so that the manipulation button 33 can be rotatably and detachably attached to the upper case. The engagement pin 16 is then fitted into the engagement hole 42 of the spring 41, whereby the manipulation button 33 is attached to the upper case 1. At this time, the vertical rib 35 of the manipulation button 33 is in contact with the reinforcement rib 14, and the flexible parts 41a and 41b of the spring 41 are fitted into the grooves 15 and 15'.

FIG. 21 is an explanatory diagram concerning distortions of the flexible parts 41a and 41b of the spring 41. When one edge of the manipulation button 33 is pressed for channel tuning, the flexible parts 41a and 41b are distorted as indicated with arrows C1, C2, D1, and D2 with the engagement hole 42, into which the engagement pin 16 is fitted, as a fulcrum. Assuming that a distorting force works in a direction C1, a returning force occurs in a direction D1. Assuming that a distorting force works in a direction D2, a returning force occurs in a direction C2. In the first example in the second embodiment, when the manipulation button 33 is manipulated, the flexible parts 41a and 41b are distorted. When the manipulation button 33 is released, the manipulation button 33 is reset by utilizing returning forces exerted by the distorted flexible parts 41a and 41b.

FIGS. 22 and 23 show a second example of the manipulation button different from the first example shown in FIGS. 17 and 18 in terms of the supporting pins 37 and 38 and the flexible parts 41a and 41b. As is apparent from the drawings, the arm members 201 and 203, arm member clamps 227, first and second convex members 221 and 222, and third and fourth convex members 228 and 229, which are shown in FIGS. 3 and 4 and employed in the first embodiment, are adapted to the manipulation button of this example. The distortions of the arm members and the returning forces exerted thereby are identical to those described in conjunction with FIGS. 8 to 10. A description will therefore be omitted.

As shown in FIG. 27, the first switch 53 and second switch 54 that are channel tuning switches are soldered to the control circuit substrate 55. The first switch 53 is pressed by the first button presser 39 (See FIGS. 19 and 20), and the second switch 54 is pressed by the second button presser 40.

As mentioned previously, the decorative frame 43 is detachably attached to the decorative frame attachment area 3. The decorative frame 43 is, as shown in FIGS. 24 to 26, shaped in line with the outline of the decorative frame attachment area 3. A round hole 44 is formed on the right edge of the surface 43A. The pair of locking projections 45 are formed on one margin of the surface 43A, and the pair of locking projections 46 are formed on the other margin thereof.

The decorative frame 43 is mounted on the decorative frame attachment area 3 with the locking projections 45 thereof locked in the engagement holes 7 and the locking projections 46 locked in the engagement holes 8. The manipulation button 33 is located in the round hole 44 and prevented from coming off from the face of the apparatus by the circumferential wall of the round hole 44.

The circular manipulation button 33 makes a seesaw movement laterally about a line linking the mutually-opposed supporting pins 37 and 38 as a center. A substantial half of the manipulation button 33 is pressed with a finger in order to cause the manipulation button to make a seesaw movement. This causes the first button presser 39 to press the first switch 53, whereby a channel is tuned. Likewise, the other substantial half of the manipulation button 33 is pressed with a finger in order to cause the manipulation button to make a seesaw movement. This causes the second button presser 40 to press the second switch 54, whereby a channel is tuned. Thus, the substantial half of the manipulation button 33 becomes a manipulated portion of the manipulation button 33. Compared with the first embodiment, this embodiment can provide great freedom for manipulation of a switch.

Moreover, if the manipulation button 33 is damaged or broken, the decorative frame 43 is detached from the decorative frame attachment area 3, and the engagement pin 16 is removed from the engagement hole 42 of the spring 41. The supporting pins 37 and 38 are disengaged from the ditch 13 of the supports 9 and 10 formed on the perimeter of the button attachment hole 4. The manipulation button 33 is thus removed from the button attachment hole 4. The manipulation button 33 can therefore be replaced with a new one from the face of the upper case. This leads to a decrease in man-hours for maintenance.

As apparent from the above description, according to the first embodiment of the present invention, compared with the channel tuning switch sheet button employed in a conventional liquid-crystal display apparatus, the manipulation button can be constructed readily by assembling parts in the course of manufacturing because gaps to be attained under the manipulation button when the manipulation button is not manipulated can be kept constant. Moreover, the manipulation button is designed to make a seesaw movement and to thus return to an equilibrium state. This leads to an improved touch in tuning a channel. Besides, the channel can be tuned reliably.

This is attributable to the fact that a returning force exerted by a switch itself and recovering forces exerted by the arm members to recover from a distorted state are used to reset the released manipulation button. A touch in tuning a channel by pressing or releasing the manipulation button, that is, a touch in clicking the manipulation button therefore improves. Even when the manipulation button is pressed, the optimal gap between the manipulation button and a switch can be retained owing to the recovering forces exerted by the arm members to recover from the distorted state. A stroke of a switch therefore remains constant. This results in improved operability.

According to the second embodiment, the seesaw type manipulation button is circular. The substantial half of the manipulation button is a manipulated portion. In addition to the advantage of the first embodiment, the advantage of greater freedom in manipulating a switch can be provided. If the manipulation button is damaged or broken, the manipulation button can be replaced with a new one from the face of the upper case. This leads to a decrease in man-hours for maintenance. Moreover, since the manipulation button can be replaced with a new one readily from the face of the upper case, when the decorative member is made available in various designs, liquid-crystal display apparatuses matched with to the tastes of many users can be provided.

INDUSTRIAL APPLICABILITY

According to the present invention, the switch manipulator is structured to have the seesaw-type manipulation button and to utilize a distorting force and returning force exerted by the manipulation button itself. The gaps between the manipulation button and opposed switches can be set readily. Parts can therefore be assembled readily in the course of manufacturing. The manufacturing cost can therefore be reduced and the quality of a product can be stabilized. Moreover, operability and a touch in manipulation improve. The industrial applicability of the present invention is therefore high.

What is claimed is:

1. A liquid-crystal display apparatus in which at least a liquid-crystal display unit accommodating a liquid-crystal panel and switches are stowed in a case, and at least an image display unit and a switch manipulator used to manipulate said switches are located on a face of said case, wherein:

said switches include at least two switches separated from each other:

said switch manipulator includes a manipulation button having a center and placed over said separated switches, arm members at substantially the center of the manipulation button, and first and second button pressers located near both ends of said manipulation button with substantially the center of said manipulation button as a fulcrum;

arm member receptors engage and support the arm members at substantially the center of the manipulation button; and one of said two switches is selectively turned on or off by one of said first or second button pressers when said manipulation button is pressed.

2. A liquid-crystal display apparatus according to claim 1, wherein said arm members on the switch manipulator have a certain length in a direction orthogonal to the longitudinal direction of said manipulation button, are formed at the center of said manipulation button and jut out from sides of said manipulation button; the arm member receptors are each composed of at least two convex members jutting down parallel to each other with a certain space between them and are formed on said case; said arm member receptors are located at at least two opposed positions coincident with said arm members on a manipulation button insertion area that is formed in said case for mounting said manipulation button; and each arm member of said manipulation button is fitted into the certain space between said two convex members constituting each arm member receptor so that said manipulation button can tilt.

3. A liquid-crystal display apparatus according to claim 2, wherein said switch manipulator has an arm member clamp composed of at least two convex members, which jut down from said case parallel to each other with a certain space between them, at at least one position outside at least one pair of convex members jutting down from said case; an arm member is clamped by said arm member clamp and is thus supported by said arm member clamp; when said manipulation button is pressed, said arm members ar distorted; when said manipulation button is released, said manipulation button is reset by utilizing the movements made by said arm members to return from the distored state.

4. A liquid-crystal display apparatus according to claim 2, wherein said switch manipulator also has an arm member clamp composed of at least two convex members, which jut down from said case parallel to each other with a certain space between them, at at least one position outside at least one pair of convex members jutting down from said case; an arm member is clamped by said arm member clamp and is thus supported by said arm member clamp; when said manipulation button is pressed, said arm member clamp opens outward, when said manipulation button is released, said manipulation button is reset by utilizing a force exerted by said arm member clamp to return to an original state.

5. A liquid-crystal display apparatus in which at least a liquid-crystal display unit accommodating a liquid-crystal panel and switches are stowed in a case, and at least an image display unit and a switch manipulator used to manipulate said switches are located on a face of said case, wherein:
said switch manipulator includes a manipulation button used to turn on or off said switches;
said manipulation button has arm members of a certain length in a direction orthogonal to the longitudinal direction, and formed substantially in the center thereof;
said arm members are twisted when said manipulation button is pressed; and
said manipulation button is reset by return movements of said arm members from the twisted state when said manipulation button is released.

6. A liquid-crystal display apparatus in which at least a liquid-crystal display unit accommodating a liquid-crystal panel and switches are stowed in a case, and at least an image display unit and a switch manipulator used to manipulate said switches are located on the face of said case, wherein:
said switch manipulator includes a manipulation button used to turn on or off said switches;
said manipulation button has arm members, which have a certain length in a direction orthogonal to the longitudinal direction, formed substantially in the center thereof;
arm member clamps each composed of at least two convex members for supporting an arm member are formed on said case;
when said manipulation button is pressed, said arm member clamp opens outward; and
when said manipulation button is released, said manipulation button is reset by utilizing forces exerted by said arm member clamps to return to an original state.

7. A liquid-crystal display apparatus in which at least a liquid-crystal display unit accommodating a liquid-crystal panel and switches are stowed in a case, and at least an image display unit and a switch manipulator used to manipulate said switches are located on a face of said case, wherein:
the switch manipulator includes at least two switches separated from each other and a manipulation button placed over the separated switches;
first and second button pressers are located near opposite ends of said manipulation button;
substantially the center of said manipulation button is defined as a fulcrum;
the fulcrum is located in an area outside of the pressers of the manipulation button; and
one of said two switches is selectively turned on or off by said first or second button presser when said manipulation button is pressed.

8. A liquid-crystal display apparatus according to any one of claims 1, 5, 6, or 7, wherein said manipulation button of said switch manipulator is made of a resin material such as ABS or PS, a carbon fiber reinforced resin material, a liquid-crystal polymer, a polypropylene material, a polyester material, or a polycarbonate material.

9. A liquid-crystal display apparatus according to claim 8, wherein said arm members of said manipulation button are made of the same material as said manipulation button.

10. A liquid-crystal display apparatus according to claim 8, wherein said arm members of said manipulation button are molded as parts of said manipulation button.

11. A liquid-crystal display apparatus in which at least a liquid-crystal display unit accommodating a liquid-crystal panel and switches are stowed in a case, and at least an image display unit and a switch manipulator used to manipulate said switches are located on the face of said case, wherein:
said switch manipulator includes a manipulation button;
a button attachment hole to be covered with said manipulation button is bored in the face of said case;
supports for supporting arm members of said manipulation button are formed at opposed positions on the perimeter of said button attachment hole;
said manipulation button has at least two supporting pins at opposed positions on the perimeter of said manipulation button;
first and second button pressers used to move said switches are located on the left-hand and right-hand sides of a line linking said supporting pins;
said manipulation button has said supporting pins fitted into said supports formed on said button attachment hole and is thus supported so that said manipulation button can tilt and can be detached.

12. A liquid-crystal display apparatus in which at least a liquid-crystal display unit accommodating a liquid-crystal panel and switches are stowed in a case, and at least an image display unit and a switch manipulator used to manipulate said switches are located on the face of said case, wherein:
said switch manipulator includes a manipulation button;
a button attachment hole to be covered with said manipulation button is bored in the face of said case;
supports for supporting arm members of said manipulation button are formed at opposed positions on the perimeter of said button attachment hole;
said manipulation button has at least two supporting pins at opposed positions on the perimeter of said manipulation button, and also has first and second button pressers, which are used to move said switches, on the left-hand and right-hand sides of a line linking said supporting pins;
a decorative member having a button exposure hole through which said manipulation button is exposed is placed on said face of said case;
said manipulation button has said supporting pins fitted into said supports formed on said button attachment hole and is thus supported so that said manipulation button can tilt and can be detached; and
said decorative member is detachable and said manipulation button is exposed through said button exposure hole of said decorative member.

13. A liquid-crystal display apparatus according to claim 11, wherein a support for supporting said manipulation button from below is placed to link said supports formed on said button attachment hole.

14. A liquid-crystal display apparatus according to claim 11, wherein said manipulation button has supporting pins located at opposed positions on the perimeter thereof and first and second button pressers located on the left-hand and right-hand sides of a line linking said supporting pins, and includes a spring having flexible parts as the left and right parts thereof and having the center part thereof aligned with an extension of the axial line of a supporting pin; said manipulation button has said supporting pins fitted into said supports formed on the perimeter of said button attachment hole, and is thus attached to said case while being supported so that said manipulation button can tilt; the center of said spring is locked in said case; said spring is distorted when said manipulation button is pressed; and said manipulation button is reset by the movement caused by said spring returning to an original state when said manipulation button is released.

15. A liquid-crystal display apparatus according to claim 11, wherein said manipulation button is circular.

16. A liquid-crystal display apparatus according to any one of claims 11 or 12, wherein said manipulation button is made of a resin material selected from ABS or PS, a carbon fiber reinforced resin material, a liquid-crystal polymer, a polypropylene material, a polyester material, or a polycarbonate material.

17. A liquid-crystal display apparatus according to any one of claims 11 or 12, wherein said spring of said manipulation button is made of the same material as said manipulation button.

18. A liquid-crystal display apparatus according to any one of claims 11 or 12, wherein said spring of said manipulation button is molded as part of said manipulation button.

19. A liquid-crystal display apparatus according to claim 7, wherein said switch manipulator has arm members, which have a certain length in a direction orthogonal to the longitudinal direction of said manipulation button, formed at the fulcrum of said manipulation button and jutted out from sides of said manipulation button; arm member receptors each composed of at least two convex members jutting down parallel to each other with a certain space between them are formed on said case; said arm member receptors are located at at least two opposed positions coincident with said arm members on a manipulation button insertion area that is formed in said case for mounting said manipulation button; and each arm member of said manipulation button is fitted into the certain space between said two convex members constituting each arm member receptor so that said manipulation button can tilt.

20. A liquid-crystal display apparatus according to claim 7, wherein said switch manipulator has an arm member clamp composed of at least two convex members, which jut down from said case parallel to each other with a certain space between them, at at least one position outside at least one pair of convex members jutting down from said case; an arm member is clamped by said arm member clamp and is thus supported by said arm member clamp; said arm members are distorted when said manipulation button is pressed; and said manipulation button is reset by movements caused by said arm members returning from the distorted state when said manipulation button is released.

21. A liquid-crystal display apparatus according to claim 7, wherein said switch manipulator also has an arm member clamp composed of at least two convex members, which jut down from said case parallel to each other with a certain space between them, at at least one position outside at least one pair of convex members jutting down from said case; an arm member is clamped by said arm member clamp and is thus supported by said arm member clamp; said arm member clamp opens outward when said manipulation button is pressed, and said manipulation button is reset by a force exerted by said arm member clamp returning to an original state when said manipulation button is released.

22. A liquid-crystal display apparatus according to claim 12, wherein a support for supporting said manipulation button from below is placed to link said supports formed on said button attachment hole.

23. A liquid-crystal display apparatus according to claim 12, wherein said manipulation button has supporting pins located at opposed positions on the perimeter thereof and first and second button pressers located on the left-hand and right-hand sides of a line linking said supporting pins, and includes a spring having flexible parts as the left and right parts thereof and having the center part thereof aligned with an extension of the axial line of a supporting pin; said manipulation button has said supporting pins fitted into said supports formed on the perimeter of said button attachment hole, and is thus attached to said case while being supported so that said manipulation button can tilt; the center of said spring is locked in said case; said spring is distorted when said manipulation button is pressed; and said manipulation button is reset by the movement caused by said spring returning to an original state when said manipulation button is released.

24. A liquid-crystal display apparatus according to claim 13, wherein said manipulation button has supporting pins located at opposed positions on the perimeter thereof and first and second button pressers located on the left-hand and right-hand sides of a line linking said supporting pins, and includes a spring having flexible parts as the left and right parts thereof and having the center part thereof aligned with an extension of the axial line of a supporting pin; said manipulation button has said supporting pins fitted into said supports formed on the perimeter of said button attachment hole, and is thus attached to said case while being supported so that said manipulation button can tilt; the center of said spring is locked in said case; said spring is distorted when said manipulation button is pressed; and said manipulation button is reset by the movement caused by said spring returning to an original state when said manipulation button is released.

25. A liquid-crystal display apparatus according to claim 22, wherein said manipulation button has supporting pins located at opposed positions on the perimeter thereof and first and second button pressers located on the left-hand and right-hand sides of a line linking said supporting pins, and includes a spring having flexible parts as the left and right parts thereof and having the center part thereof aligned with an extension of the axial line of a supporting pin; said manipulation button has said supporting pins fitted into said supports formed on the perimeter of said button attachment hole, and is thus attached to said case while being supported so that said manipulation button can tilt; the center of said spring is locked in said case; said spring is distorted when said manipulation button is pressed; and said manipulation button is reset by the movement caused by said spring returning to an original state when said manipulation button is released.

26. A liquid-crystal display apparatus according to claim 12, wherein said manipulation button is circular.

27. A liquid-crystal display apparatus according to claim 13, wherein said manipulation button is circular.

28. A liquid-crystal display apparatus according to claim 14, wherein said manipulation button is circular.

29. A liquid-crystal display apparatus according to claim 22, wherein said manipulation button is circular.

30. A liquid-crystal display apparatus according to claim 23, wherein said manipulation button is circular.

31. A liquid-crystal display apparatus according to claim 24, wherein said manipulation button is circular.

32. A liquid-crystal display apparatus according to claim 25, wherein said manipulation button is circular.

* * * * *